United States Patent [19]
Cerny et al.

[11] 4,188,313
[45] Feb. 12, 1980

[54] COMPOSITIONS INTENDED FOR THE FLAMEPROOFING OF PLASTICS

[75] Inventors: Jacqueline Cerny; Gilbert Vivant, both of Lyon, France

[73] Assignee: Rhone-Poulenc Industries, Paris, France

[21] Appl. No.: 690,843

[22] Filed: May 28, 1976

[30] Foreign Application Priority Data

Jun. 10, 1975 [FR] France .................................. 75 18038

[51] Int. Cl.² ............................................. C08L 63/00
[52] U.S. Cl. ........................... 260/37 EP; 260/45.7 P; 260/DIG. 24
[58] Field of Search ................... 260/37 EP, DIG. 24, 260/45.7 P

[56] References Cited

U.S. PATENT DOCUMENTS

| 3,477,982 | 11/1969 | Dijkstra et al. | 260/37 EP |
| 3,883,475 | 5/1975 | Racky et al. | 260/45.7 P |

OTHER PUBLICATIONS

Kirk-Othmer; Encyclopedia of Chemical Technology; 2nd Ed.; vol. 13; pp. 440, 441, 443; Interscience, 1967.
Lee et al.; Handbook of Epoxy Resins; 1967; McGraw-Hill Book Co.; pp. 7-10, 7-11, 7-12.

Primary Examiner—Lewis T. Jacobs
Attorney, Agent, or Firm—McDougall, Hersh & Scott

[57] ABSTRACT

Compositions based on red phosphorus and epoxy resin for flame proofing plastics without the release of toxic products during use. The compositions consist of a pulverulent mixture containing from 50 to 95% by weight of red phosphorus and from 5 to 50% by weight of compounds having epoxy groups in their chain.

8 Claims, No Drawings

COMPOSITIONS INTENDED FOR THE FLAMEPROOFING OF PLASTICS

The present invention, relates to compositions, based on red phosphorus, for flameproofing plastics.

Red phosphorus, in addition to various applications such as coating for a match-striking surface, is also used as a flameproofing agent for plastics. However, this application is restricted by the dangers encountered, such as pollution hazards, and difficulties in using the material with full safety. Red phosphorus is a very good flameproofing agent because, for a given activity, it can be used in a much smaller amount than, for example, the halogen derivatives. Furthermore, its use in plastics results in better mechanical properties and does not interfere with the electrical properties of the plastics.

It is known, from French Pat. No. 2,052,784, to use red phosphorus, in a proportion of 0.5 to 15%, as a flameproofing agent for moulding compositions based on glass fibre-filled polyamides.

However, red phosphorus, used by itself directly in plastic moulding compositions, suffers from the disadvantage that it is in the form of particles which present the hazard of igniting easily, for example, in the presence of hot surfaces or under the influence of pressure.

To deal with these disadvantages, it has been proposed, according to French Pat. No. 2,074,394 (British Pat. No. 1,326,929) to incorporate into the thermoplastic, which may be reinforced with glass fibres, red phosphorus impregnated with a lactam containing 4 to 12 carbon atoms, for example caprolactam, in a proportion of 1 to 20% relative to the weight of the polymer.

However, the essential disadvantage of this process is the hygroscopic nature of the lactams and the fact that the presence of water in the mixture causes the formation of phosphine, which is very toxic and ignites spontaneously in air, especially at the temperatures at which polymers are processed.

German patent application No. 2,308,104 discloses compositions of thermoplastics flameproofed by red phosphorus and containing metal oxides to prevent any evolution of phosphine in the course of storage at ambient temperature. However, the presence of metal oxides is insufficient to prevent the evolution of phosphine which occurs at high temperatures.

It was thus necessary and it is an object of this invention, to find a means which enables red phosphorus to be employed without the hazard of evolution of phosphine essentially due to the use temperature and to the presence of small amounts of water in the polymers being moulded.

It has now been found that this latter object is achieved when use is made of compositions intended for flameproofing plastics consisting of a pulverulent mixture comprising:

(a) from 50 to 95% by weight of red phosphorus in the form of powder and (b) from 5 to 50% by weight of one or more compounds having epoxy groups in their chain.

Red phosphorus is to be understood as all the coloured allotropic varieties, which are sold commercially under the name red phosphorus and which may contain up to 3% metal oxides or metal salts as stabilisers.

This red phosphorus must be in the form of particles having a mean diameter of less than 200μ and preferably of less than 100μ. The use of particles which are only a few microns in diameter makes it possible to flameproof spun articles for textile usage.

Compounds having epoxy groups in their chain refers essentially to epoxy resins.

The expression "epoxy resin" is used here in its customary sense, that is to say it denotes a compound containing more than one

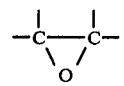

group, the said compound being present, depending on the proportion and nature of the starting reactants, either in the form of a more or less viscous liquid or of a solid of relatively low melting point, or in the form of a partially crosslinked product.

All the customary epoxy resins can be used in the compositions according to the invention. Thus it is possible to use polyglycidyl esters which can be obtained by reaction of a polycarboxylic acid with epichlorohydrin, or the dichlorohydrin of glycerol in the presence of an alkali. Such polyglycidyl esters can be derived from aliphatic dicarboxylic acids, for example oxalic acid, succinic acid, glutaric acid, adipic acid, pimelic acid, suberic acid, azelaic acid, sebacic acid or dimerised or trimerised linoleic acid, and from aromatic dicarboxylic acids such as phthalic acid, isophthalic acid, terephthalic acid, naphthalene-2,6-dicarboxylic acid, diphenyl-2,2'-dicarboxylic acid and the bis-(4-carboxyphenyl)ether of ethylene glycol.

Preferably, such polyglycidyl esters are, for example, diglycidyl adipate and those of the diglycidyl esters which correspond to the average formula:

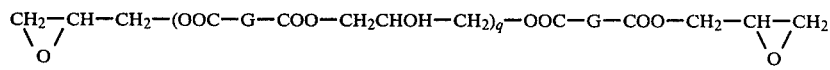

in which G represents a divalent hydrocarbon radical, such as a phenylene group, and q represents an integral or fractional positive number.

Other examples of epoxy resins are the polyglycidyl ethers which can be obtained by interaction of a divalent or polyvalent alcohol and epichlorohydrin or a similar substance (such as the dichlorohydrin of glycerol) under alkaline conditions or, by way of a variant, in the presence of an acid catalyst, with subsequent treatment with an alkali.

These compounds can be derived from diols or polyols such as ethylene glycol, diethylene glycol, triethylene glycol, propane-1,2-diol, propane-1,3-diol, butane-1,4-diol, pentane-1,5diol, hexane-1,6-diol, the polyhydroxylic cycloalkanes, hexane-2,4,6-triol, glycerol or the N-aryl-dialkanolamines, such as N-phenyl-diethanolamine, and are preferably derived from divalent or polyvalent phenols, such as resorcinol, catechol, hydroquinone, 1,4-dihydroxynaphthalene, 1,5-dihydroxynaphthalene, bis-(4-hydroxyphenyl)-methane, 1,1,2,2-tetrahydroxyphenyl-ethane, bis-(4-hydroxyphenyl)-methyl-phenyl-methane, the bis-(4-hydroxyphenyl)-tolymethanes, 4,4'-dihydroxydiphenyl, bis-(4- hydroxyphenyl)-sulphone and in particular 2,2-bis-(4-hydroxyphenyl)-propane or the condensation products of a phenol with an aldehyde.

Similarly it is also possible to employ aminopolyepoxides such as those which are obtained, for example, by dehydrohalogenation of the reaction products of epihalogenohydrins with primary or di-secondary amines, such as aniline, n-butylamine, bis-(4-aminophenyl)-methane or bis-(4-methylaminophenyl)-methane; and the epoxy resins obtained by epoxidation of cyclic polyolefines such as vinylcyclohexane dioxide, limonene dioxide and dicyclopentadiene dioxide, the glycidyl ether of 3,4-epoxy-dihydro-dicyclopentadienyl, 3,4-epoxy-cyclohexylmethyl 3',4'-epoxy-cyclohexanecarboxylate and its 6,6'-dimethyl derivative, ethylene glycol bis-(3,4-epoxy-cyclohexane)-carboxylate, the acetal formed between the carboxylic aldehyde of 3,4-epoxy-cyclohexane and 1,1-bis-(hydroxymethyl)-3,4-epoxy-cyclohexane; and epoxidised butadienes or epoxidised copolymers of butadiene with ethylenic compounds such as styrene and vinyl acetate.

Numerous works refer to the preparation of such epoxy resins; there may be mentioned, for example, "The Encyclopaedia of Polymer Science and Technology", Volume 6, page 209 et seq., from Interscience Publishers 1967.

The epoxy equivalent weight—which represents the weight of resin (in grams) which contains one gram equivalent of epoxy (groups)—can vary within very wide limits. Preferably, resins of which the epoxy equivalent weight is between 80 and 1,000 are used, but these values are not to be considered as limiting the scope of the invention; as regards the physical characteristics of the resin, they range from liquid resins of very low viscosity (2 cPo at 25° C.) to solids of which the melting point may be as high as 180° C.

If it is desired to use the epoxy resin in the form of a crosslinked product, use should be made of hot or cold curing agents of the usual types, such as polycarboxylic anhydrides, or primary, secondary or tertiary, aliphatic or aromatic, amines. All these curing agents are described in the work "Encyclopaedia of Polymer Science", supra.

Depending on their physical form, the epoxy resins can, if they are liquid, be deposited on the surface of the phosphorus particles by any known means. If they are solid, they may be mixed intimately, in the form of a powder, (with the phosphorus particles) by any known method of homogenisation of powders.

It is known furthermore that the addition of metal oxides or metal salts stabilises red phosphorus; some are usually contained in red phosphorus sold commercially. The addition of metal oxides, which makes it possible to reduce possible evolution of phosphine, is included within the scope of the invention. The metal oxides which give the best results in such use are the oxides of copper, zinc, silver, iron, antimony, vanadium, tin, titanium or magnesium, but preferably copper oxide.

The amounts of metal oxides used can vary depending on the amount of epoxy resin used depending on the conditions of use of the synthetic resins as well as the nature of these synthetic resins. Usually, up to 100% by weight, relative to the red phosphorus, of metal oxide can be employed.

Many synthetic polymers are used to obtain shaped articles which more and more frequently must be flameproofed. Numerous compositions based on thermoplastic polymers, thermosetting polymers, or elastomeric polymers can be flameproofed according to the invention. Amongst the thermoplastic polymers there may be mentioned the polyolefines, such as high or low density polyethylenes, polypropylene, polyfluoroethylenes and ethylene-propylene copolymers; the polyvinyl compounds such as polyvinyl chloride or copolymers of vinyl chloride; the polystyrenes and acrylonitrile-butadiene-styrene copolymers; the polyamides such as poly(hexamethylene adipamide), polycaprolactam, poly(hexamethylene sebacamide), polyundecanamide, polylauryllactam and poly(hexamethylene azelamide); the saturated polyesters, such as poly(ethylene glycol terephthalates) or poly(butylene glycol terephthalates); the polycarbonates; the polyacetals; the polyacrylic compounds, such as poly(methyl methacrylate); the cellulose esters; and polyurethanes or polyamide-imides.

Amongst the thermosetting poylmers there may be mentioned the phenolic resins, the aminoplasts, the unsaturated polyesters, the polyepoxides and the polyimides.

Various elastomers can also be flameproofed using the compositions according to the invention. For example, the natural or synthetic rubbers, the silicone rubbers and the polyurethane elastomers may be mentioned.

All these plastics, when intended especially for producing shaped articles, are usually employed with various adjuvants, namely reinforcing fillers such as glass fibres; fillers intended to impart specific characteristics to the shaped articles; or inert fillers such as kaolin or talc; antioxidants, various stabilisers, dyestuffs or pigments.

A content of flameproofing composition of 0.2 to 20% by weight relative to the plastic is usually chosen to obtain a suitable flameproof effect.

EXAMPLE 1

35.7 g of an epoxy resin of the NOVOLAC type, having an epoxy equivalent weight of 180, are dissolved in 70 g of the dimethyl ether of diethylene glycol, alos referred to as diglyme. 68.7 g of powdered red phosphorus, having a particle size of between 20 and 30μ, are suspended with stirring. The mixture is stirred for 5 minutes to give a homogeneous suspension and a solution containing 10.1 g of diaminodiphenylmethane and 20 g of diglyme is added. The batch is heated to 170° C. for 2 hours, with constant stirring. Gelling takes place.

This gel is poured into a vessel containing 2 liters (1) of water and equipped with a turbine (stirrer). 112 g of a powder are isolated and dried.

30 g of the coated red phosphorus and 300 g of poly(hexamethylene adipamide), having a mean molecular weight of 20,000 and an inherent viscosity, in meta-cresol, of 1.3, are introduced into a jacketed one liter autoclave equipped with a spiral scraper-type stirrer, revolving at 20 rpm, and heated by heating fluid. The mixture is heated gradually, whilst stirring, so that it reaches a temperature of 285° C. after one hour. It is maintained at this temperature for one hour.

Any phosphine which may be evolved is determined. For this purpose, the gases, on leaving the autoclave, are trapped in two 1,000 cm$^3$ flasks in series, containing 750 cm$^3$ of a 2% aqueous solution of mercuric chloride, and the acid formed is determined in the presence of methyl orange.

This method of determination has been described by WILMET in "Comptes rendus de l'Academie des Sciences" 185 (1927), page 206.

The weight of phosphine evolved is 7 mg per gram of red phosphorus employed.

A blank experiment carried out under the same conditions, but with 18 g of red phosphorus, gives an evolution of phosphine of 33.5 mg per gram of red phosphorus employed.

To test the flameproofing produced by the red phosphorus and the epoxy resin, plates of size 100 mm×6 mm, and of 3 mm thickness, are prepared by cold sintering under a pressure of 300 kg/cm$^2$.

The limiting oxygen index is measured by the LOI test in accordance with Standard Specification ASTMD 2863.

The following results are obtained:

|  | LOI test |
| --- | --- |
| Polyamide alone | 20.8 |
| Polyamide + red phosphorus | 26–27 |

EXAMPLE 2

The procedure of EXAMPLE 1 is followed, except that 6 g of copper oxide are added to the red phosphorus coated with epoxy resin.

No evolution whatsoever of phosphine is observed.

EXAMPLE 3

An epoxy resin powder is prepared by following the procedure in Example 1, except that red phosphorus was not added.

Thereafter, 12 g of epoxy resin powder and 18 g of red phosphorus powder are mixed.

The mixture is then introduced into the autoclave with 300 g of polyamide, and the procudure indicated in Example 1 is followed.

11 mg of phosphine are evolved per gram of red phosphorus employed.

EXAMPLE 4

A single-screw laboratory extruder, having a screw length of 415 mm and a diameter of 15 mm is used. This extruder is equipped with a cylindrical die having a diameter of 3 mm. The barrel temperatures are as follows: 250° C. at the material inlet, 280° C. at the centre and 270° C. at the die.

The following composition is prepared by simple mixing: 100 g of poly(hexamethylene adipamide) having a mean molecular weight of 20,000 and an inherent viscosity, in meta-cresol, of 1.3, 20 g of red phosphorus coated in accordance with Example 1 and 4 g of copper oxide powder.

This composition is introduced into the extruder and a strand is extruded.

During the entire operation, tests were conducted for the possible presence of phosphine in various parts of the extruder by means of a DRAEGER CH 31,101 tube. Similarly, attempts were made to detect phosphine when the strand which has just been extruded, and which is still hot, is broken.

All these tests were negative.

EXAMPLE 5

Coated red phosphorus is prepared as follows:

By agitation in a revolving drum, a mixture is made of 120 g of red phosphorus powder, 65.3 g of epoxy resin having an epoxy equivalent weight of 845 (melting point = 90°–100° C.) and 14.7 g of melamine. The mixture thus obtained is deposited at a thickness of about 1 cm on a plate and is heated in an oven for 3 hours at 120° C. and then for 3 hours at 150° C. The slab obtained after cooling is granulated.

The following composition is prepared by simple mixing: 87.7 g of poly(tetramethylene glycol terephthalate) granules (viscosity 3,5000 poises), 0.3 g of cepretol (polyalkylene glycol laurate), 2 g of copper oxide powder and 10 g of coated red phosphorus.

This composition is introduced into the extruder used for Example 4 and is extruded as strands. The barrel temperatures are as follows: 215° C. at the material inlet, 240° C. at the centre and 235° C. at the die. No evolution whatsoever of phosphine is detected in any area.

EXAMPLE 6

The procedure of Example 5 is followed, replacing the poly(tetramethylene glycol terephthalate) by the same amount of polypropylene powder having the following characteristics: d=0.903, melting point: 165°–170° C., melt index: 6 (at 230° C. under 2.16 kg, in g/10 minutes).

The barrel temperatures are respectively 205° C., 220° C. and 205° C. No evolution whatsoever of phosphine is detected.

EXAMPLE 7

The procedure of Example 5 is followed, except that the poly(tetramethylene glycol terephthalate) is replaced by the same amount of polystyrene powder, d=1.05, melt index 4–4.5 (at 200° under 5 kg). The extruder barrel temperatures are, respectively, 220° C., 240° C. and 230° C. No evolution whatsoever of phosphine is detected.

The limiting oxygen index is measured

|  | LOI test |
| --- | --- |
| Polystyrene alone | 19 |
| Polystyrene + phosphorus | 22 |

EXAMPLE 8

1,500 g of red phosphorus powder and 1,000 g of epoxy resin (epoxy equivalent weight 845, melting point 90°–100° C.) are mixed by agitation on rollers. The powder mixture is spread on a plate to a thickness of about 1 cm and is then heated in an oven at 130° C. for 3 hours. After cooling, it is cut into humbug-shaped pieces. The granules contain 60% of red phosphorus.

Poly(hexamethylene adipamide) (molecular weight 20,000) filled with 30% of glass fibres is flameproofed. The following ingredients are mixed: 88.7 g of the filled polyamide, 0.3 g of cepretol, 1 g of copper oxide and 10 g of the coated red phosphorus.

An extruder (described in Example 4) is fed with this mixture. The barrel temperatures are: 265° C. at the material inlet, 280° C. at the centre and 265° C. at the die.

A strand of good quality is obtained, without detecting phosphine in any part of the extruder.

EXAMPLES 9 TO 11

The following polymers described in Examples 5 to 7 are flameproofed by means of the coated red phosphorus prepared according to Example 8: poly(tetramethylene terephthalate, polypropylene and polystyrene.

The working conditions and the amounts are the same as those described in Examples 5 to 7.

In all these experiments, a strand of good quality is obtained and no evolution whatsoever of phosphine is detected by means of the DRAEGER CH 31,101 tube.

We claim:

1. Compositions for flameproofing plastics, which compositions are in particulate form and do not evolve toxic products when use is made of the plastics characterised in that the flameproofing composition consists of a mixture comprising
   (a) 50 to 95% by weight of red phosphorus in the form of a powder having a mean particle size of less than 200μ and
   (b) 5 to 50% by weight of epoxy resins, and in which the particles of red phosphorus are coated with the epoxy resin.

2. Compositions as claimed in claim 1, in which (b) is a non-crosslinked epoxy resin.

3. Compositions as claimed in claim 1, in which (b) is an epoxy resin partially cross-linked.

4. Compositions as claimed in claim 1, in which the epoxy resins are polymers having an epoxy equivalent weight of between 80 and 1,000.

5. Compositions as claimed in claim 1, which contain in addition up to 100% by weight, relative to the red phosphorus, of a metal oxide selected from the group consisting of the oxides of copper, zinc, silver, iron, antimony, vanadium, tin, titanium or magnesium.

6. A plastic composition for the production of flameproofed shaped articles comprising a plastic, with or without filler, in which the plastic is flameproofed by admixture with 0.2 to 20% by weight of previously formed particles of 50 to 95% by weight red phosphorus and 5 to 50% by weight epoxy resin, in which in the preformed particles the phosphorus is coated with the epoxy resin compound.

7. Plastic compositions as claimed in claim 6, in which the plastic is a glass fibre filled plastic.

8. Plastic compositions as claimed in claim 6, in which the plastic is a filled plastic in which the filler is selected from the group consisting of talc and kaolin.

* * * * *